(12) United States Patent
Squier et al.

(10) Patent No.: US 8,669,488 B2
(45) Date of Patent: Mar. 11, 2014

(54) SPATIALLY CHIRPED PULSES FOR FEMTOSECOND LASER ABLATION THROUGH TRANSPARENT MATERIALS

(75) Inventors: Jeffrey Squier, Golden, CO (US); Dawn Vitek, Lakewood, CO (US); Charles Durfee, Golden, CO (US); Daniel Adams, Golden, CO (US); David Kleinfeld, San Diego, CA (US)

(73) Assignee: Colorado School of Mines, Golden, CO (US)

( * ) Notice: Subject to any disclaimer, the term of this patent is extended or adjusted under 35 U.S.C. 154(b) by 265 days.

(21) Appl. No.: 13/065,778

(22) Filed: Mar. 30, 2011

(65) Prior Publication Data

US 2011/0297651 A1 Dec. 8, 2011

Related U.S. Application Data

(60) Provisional application No. 61/319,757, filed on Mar. 31, 2010, provisional application No. 61/384,956, filed on Sep. 21, 2010.

(51) Int. Cl.
*G02B 26/00* (2006.01)
*B23K 26/06* (2006.01)
*B23K 26/36* (2006.01)

(52) U.S. Cl.
USPC .............. 219/121.68; 219/121.69; 359/238; 359/337

(58) Field of Classification Search
USPC .......... 359/333, 337, 569, 615, 238; 398/160; 219/121.68, 121.69, 121.75; 250/492.1
See application file for complete search history.

(56) References Cited

U.S. PATENT DOCUMENTS

| | | | |
|---|---|---|---|
| 6,804,045 B2 | 10/2004 | Barty | |
| 2007/0041082 A1 | 2/2007 | Bullington et al. | |
| 2008/0051772 A1 | 2/2008 | Suckewer et al. | |
| 2009/0261082 A1 | 10/2009 | Wagner | |
| 2009/0273828 A1 * | 11/2009 | Waarts et al. | 359/341.1 |
| 2009/0275927 A1 | 11/2009 | Fein et al. | |

FOREIGN PATENT DOCUMENTS

WO  WO 2009/042347  4/2009

OTHER PUBLICATIONS

Coughlan et al. "Parametric Spatio-Temporal Control of Focusing Laser Pulses." Optics Express, Aug. 2009, vol. 17, No. 18, pp. 15808-15820.
Durst et al. "Enhanced axial confinement of sum-frequency generation in a temporal focusing setup." Optics Letters, Jun. 2009, vol. 34, No. 12, pp. 1786-1788.
Durst et al. "Simultaneous spatial and temporal focusing in nonlinear microscopy." Optics Communications, Apr. 2008, vol. 281, No. 7, pp. 1796-1805.
Hwang et al. "Liquid-assisted femtosecond laser drilling of straight and three-dimensional microchannels in glass." Applied Physics A Materials Science & Processing, Aug. 2004, vol. 79, No. 3, pp. 605-612.

(Continued)

*Primary Examiner* — Samuel M Heinrich
(74) *Attorney, Agent, or Firm* — Sheridan Ross P.C.

(57) ABSTRACT

Temporal focusing of spatially chirped femtosecond laser pulses overcomes previous limitations for ablating high aspect ratio features with low numerical aperture (NA) beams. Simultaneous spatial and temporal focusing reduces nonlinear interactions, such as self-focusing, prior to the focal plane so that deep (~1 mm) features with parallel sidewalls are ablated at high material removal rates.

22 Claims, 9 Drawing Sheets
(6 of 9 Drawing Sheet(s) Filed in Color)

(56) References Cited

OTHER PUBLICATIONS

Oron et al. "Harmonic generation with temporally focused ultrashort pulses." Journal of the Optical Society of America B, Dec. 2005, vol. 22, No. 12, pp. 2660-2663.

Oron et al. "Spatiotemporal coherent control using shaped, temporally focused pulses." Optics Express, Nov. 2005, vol. 13, No. 24, pp. 9903-9908.

Oron et al. "Scanningless depth-resolved microscopy." Optics Express, Mar. 2005, vol. 13, No. 5, pp. 1468-1476.

Vitek et al. "Temporally focused femtosecond laser pulses for low numerical aperture micromachining through optically transparent materials." Optics Express, Aug. 2010, vol. 18, No. 17, pp. 18086-18094.

Vitek et al. "Spatially Chirped Pulses for High Aspect Ratio Micromachining by Femtosecond Laser Ablation." in Conference on Lasers and Electro-Optics, OSA Technical Digest (CD) (Optical Society of America, 2010), paper CMBB5, 2 pages.

Vitek et al. "Spatio-temporally focused femtosecond laser pulses for nonreciprocal writing in optically transparent materials." Optics Express, Nov. 2010, vol. 18, No. 24, pp. 24673-24678.

Zhu et al. "Simultaneous spatial and temporal focusing of femtosecond pulses." Optics Express, Mar. 2005, vol. 13, No. 6, pp. 2153-2159.

Written Opinion for International (PCT) Patent Application No. PCT/US2011/030746, mailed Jun. 2, 2011 6 pages.

International Search Report for International (PCT) Patent Application No. PCT/US2011/030746, mailed Jun. 2, 2011 2 pages.

International Preliminary Report on Patentability for International (PCT) Patent Application No. PCT/US2011/030746, mailed Oct. 11, 2012 8 pages.

\* cited by examiner

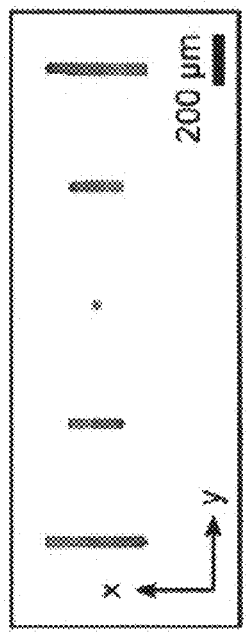
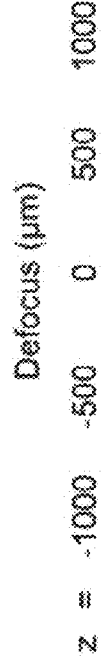
FIG. 3B
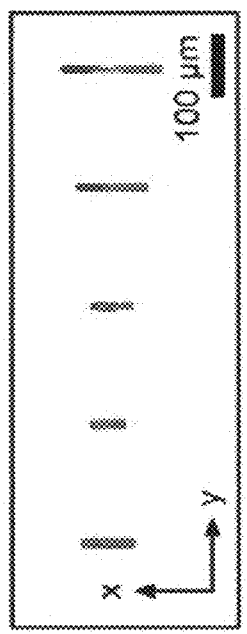
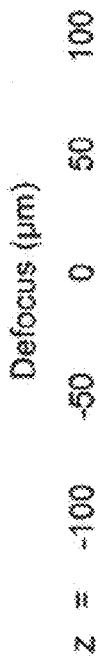
FIG. 3D
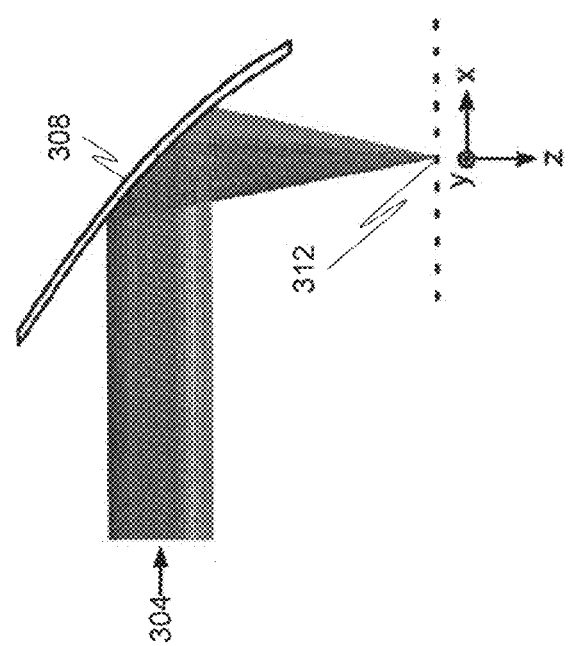
FIG. 3A
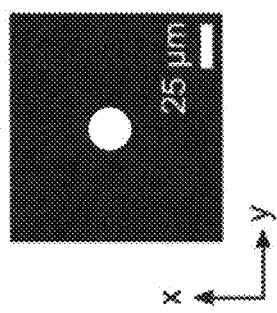
FIG. 3C

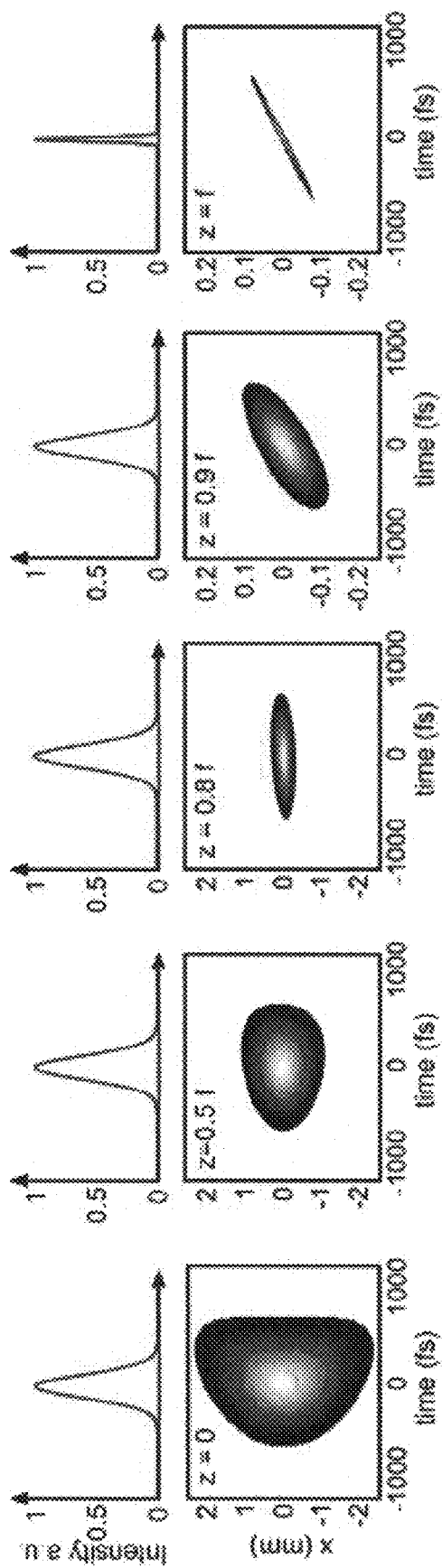

SPATIALLY CHIRPED PULSES FOR FEMTOSECOND LASER ABLATION THROUGH TRANSPARENT MATERIALS

CROSS-REFERENCE TO RELATED APPLICATIONS

This Application claims the benefit of U.S. Provisional Application Nos. 61/319,757 and 61/384,956, filed Mar. 31, 2010 and Sep. 21, 2010, respectively, the entire disclosures of which are hereby incorporated herein by reference.

This invention was supported, in part, using funds provided by the terms of EB003832 and MH085499 awarded by the National Institutes of Health and/or the terms of FA9550-07-10026 and FA9550-10-C-0017 awarded by the AFOSR and/or by the terms of 09BGF-03 and 09BGF-04 awarded by the Colorado Bioscience Discovery. The government has certain rights to this invention.

FIELD OF THE DISCLOSURE

The disclosure relates to optics and specifically to mechanisms for focusing spatially chirped pulses for femtosecond laser material modification.

BACKGROUND

Micromachining with femtosecond laser pulses, in which the transient generation of a plasma leads to the ablation of material, is a powerful technique to cut chemically inert media such as glass. This procedure uniquely facilitates the prototyping of three-dimensional (3D) microanalytic devices with sub-diffraction-limited features. However, single-step processing has been limited in the size and aspect ratio of the features that can reasonably be produced in these media. As examples, in most fabrication techniques a laser beam is focused on the front surface of the substrate and ablation proceeds from the top down. Thus, successive pulses must focus through debris created by earlier pulses, and the pulses ultimately interact with the walls of the structure as the feature becomes deeper. This leads to a tapering of the feature that limits the aspect ratio.

An improved machining method would enable processing to take place through the backside of the wafer. Machining in this manner means that successive pulses would no longer focus through debris, nor interact with the walls, and thus makes it possible to produce exceptionally high aspect ratio features. Some systems have been designed which ablated high aspect ratio structures on the back surface of 1 mm thick glass at high numerical aperture (0.55 NA). The working distance of these original systems has been extended by employing a long working distance objective at 0.42 NA.

Other systems have achieved high aspect ratio structures with Bessel beams by focusing on the backside of the substrate. However, Bessel beams do not have the same 3D control as other techniques.

An improvement to backside machining would be to use lower NA beams to increase the interaction volume but without compromising 3D spatial confinement.

SUMMARY

A high rate of cutting is important for applications where a significant volume of material must be ablated. For example, microfluidic devices require networks of channels that extend centimeters in length and laser surgery involves the removal of many cubic millimeters of material. A high rate of cutting appropriate for such applications is achieved by the introduction of temporal focusing.

In accordance with at least some embodiments of the present disclosure, in this technique of temporal focusing, spatial chirping is used to form a frequency-distributed array of low NA beamlets, which coalesce to reform a transform-limited and diffraction-limited pulse at the focus of the objective.

By adapting temporal focusing to an ablation beam, embodiments of the present disclosure are able to improve the machining rate and perform selective ablation through thick, optically transparent samples at 0.05 NA, for example.

As a non-limiting example, temporally focused beams can be employed to write approximately 2 mm long, sub-surface microfluidic channels in a microfluidic device while simultaneously improving channel shape. Similar gains can also be envisioned for micromachining applications and other applications where materials are cut, bonded, modified (e.g., locally densified), etc.

In accordance with at least some embodiments of the present disclosure, an optical system is provided that comprises:

a first optical element or collection of optical elements which spatially chirp and collimate temporally chirped pulses of light as well as cause intensities of a plurality of frequencies of the spatially chirped and collimated light to overlap in time but not overlap spatially; and a second optical element or collection of optical elements which focus the plurality of frequencies to overlap spatially at a focal plane.

A method is also provided which generally comprises:

generating temporally chirped pulses of electromagnetic light;

spatially chirping and collimating the temporally chirped pulses of light;

causing frequencies of the spatially chirped and collimated light to overlap in time; and causing the frequencies of the spatially chirped and collimated light to only overlap spatially at a focal plane.

It should be noted that there are a number of different kinds of spatial chirp. One type of spatial chirp is a transverse spatial chirp where the wavelength components of a beam are all parallel to one another before being focused. Another type of spatial chirp is an angular spatial chirp. It should be noted that while embodiments of the present disclosure are primarily described in connection with a transverse spatial chirp, the disclosure is not so limited and those of ordinary skill in the art will appreciate that certain optical elements described herein can be modified to accommodate the use of angular spatial chirps without departing from the scope of the present disclosure.

The Summary is neither intended or should it be construed as being representative of the full extent and scope of the present invention. The present disclosure is set forth in various levels of detail and the Summary as well as in the attached drawings and in the detailed description of the disclosure and no limitation as to the scope of the present disclosure is intended by either the inclusion or non inclusion of elements, components, etc. in the Summary. Additional aspects of the present disclosure will become more readily apparent from the detailed description, particularly when taken together with the drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The present disclosure is described in conjunction with the appended figures:

FIG. 3A is a side view of a geometric optics model in accordance with embodiments of the present disclosure;

FIG. 3B is a chart depicting the shape of the beam spot created in FIG. 3A;

FIG. 3C is an image of the focal plasma in air in accordance with embodiments of the present disclosure;

FIG. 3D is a chart depicting an asymmetric beam spot at focus with the addition of fused silica to simulate backside machining in accordance with embodiments of the present disclosure;

FIG. 4A is a chart depicting the spatio-temporal beam propagation simulated in the spatially chirped dimension, x, generated by Fourier pulse propagation using a non-paraxial propagator where z=0 in accordance with embodiments of the present disclosure;

FIG. 4B is a chart depicting the spatio-temporal beam propagation simulated in the spatially chirped dimension, x, generated by Fourier pulse propagation using a non-paraxial propagator where z=0.5 f in accordance with embodiments of the present disclosure;

FIG. 4C is a chart depicting the spatio-temporal beam propagation simulated in the spatially chirped dimension, x, generated by Fourier pulse propagation using a non-paraxial propagator where z=0.8 f in accordance with embodiments of the present disclosure;

FIG. 4D is a chart depicting the spatio-temporal beam propagation simulated in the spatially chirped dimension, x, generated by Fourier pulse propagation using a non-paraxial propagator where z=0.9 f in accordance with embodiments of the present disclosure;

FIG. 4E is a chart depicting the spatio-temporal beam propagation simulated in the spatially chirped dimension, x, generated by Fourier pulse propagation using a non-paraxial propagator where z=f in accordance with embodiments of the present disclosure;

DETAILED DESCRIPTION

Figure 1:
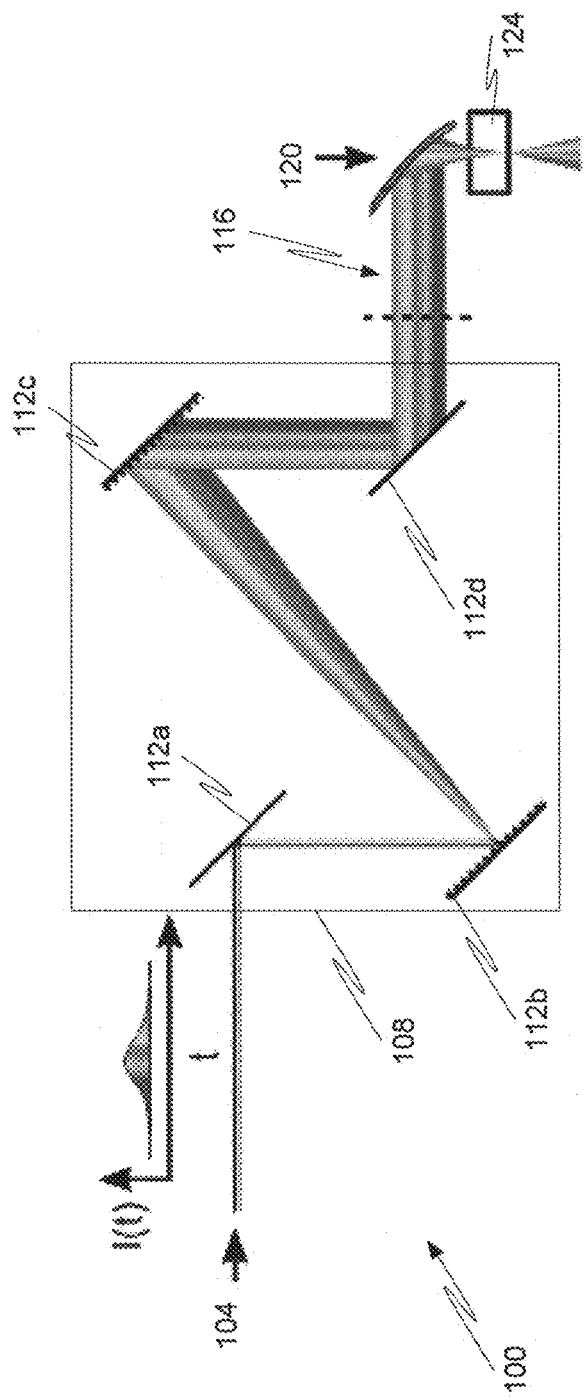
FIG. 1 is a schematic diagram depicting an optical system in accordance with embodiments of the present disclosure.

The ensuing description provides embodiments only, and is not intended to limit the scope, applicability, or configuration of the claims. Rather, the ensuing description will provide those skilled in the art with an enabling description for implementing the described embodiments. It being understood that various changes may be made in the function and arrangement of elements without departing from the spirit and scope of the appended claims.

Specifically, mechanisms are provided in which temporal focusing of spatially chirped femtosecond laser pulses overcome previous limitations for ablating high aspect ratio features with low numerical aperture (NA) beams (e.g., beams having NA of approximately 0.03-0.05). Simultaneous spatial and temporal focusing reduces nonlinear interactions, such as self-focusing, prior to the focal plane so that deep (e.g., approximately 1 mm) features with parallel sidewalls are ablated at high material removal rates (e.g., 25 µm3 per 80 µJ pulse) at 0.03-0.05 NA.

This technique can be applied to the fabrication of microfluidic devices (constructed of glass, similar silica-based materials, Polydimethylsiloxane (PDMS), or the like for instance) by ablation through the back surface of thick (at least 6 mm) fused silica substrates. It may also be used to ablate other materials such as plastics, glass, composites of glass and plastic, metal, ceramics, and the like as well as bone under aqueous immersion to produce craniotomies.

In other words, several embodiments of the present disclosure will be described in connection with a system designed to ablate channels and/or holes on the back surface of a material or sample. It should be appreciated, however, that embodiments of the present disclosure are not so limited. Rather, the concepts disclosed herein can be applied to cut materials, bond materials, modify materials (e.g., bend, densify, etc.), and so on.

As one non-limiting example, embodiments of the present disclosure can be utilized in surgical applications (e.g., orthopedic surgical applications, opthalmic surgical applications, orthoscopic surgical applications, etc.).

As another non-limiting example, embodiments of the present disclosure can be utilized in data storage applications by writing logical bits onto a disk drive or array of disk drives, which may be stacked on one another to conserve space. Since the spatially chirped pulses of light can be focused through materials, the disks may be stacked one on top of another and data may be written to any one of the disks in the stack. The bits of data may be written to the disks by simply altering properties of the disk material (e.g., densifying, activating a light-response material on the disk, etc.) rather than actually cutting the material.

As an example, when 50 µJ, 60 fs, pulses (centered at 800 nm) are focused through a 6 mm thick fused silica sample at 0.05 NA without temporal focusing, it can be observed that the beam self-focuses and collapses into a filament. This self-focusing makes it difficult or impossible to selectively ablate the back surface of the sample, and the entire thickness of the glass is modified along the direction of propagation. Also, without spatially chirped pulses, self-focusing and supercontinuum generation result in a loss of intensity at the focus. Conversely, with the temporal focusing proposed by the present disclosure, by using the same pulse energy and duration and focal spot size, it becomes possible to selectively ablate only the back surface of the sample leaving the glass volume nearly unblemished. Moreover, with spatially chirped pulses, self-focusing and continuum generation are suppressed and the backside of the glass sample is ablated with great precision.

Referring initially to FIG. 1, an optical system 100 which enables temporal focusing will be described in accordance with at least some embodiments of the present disclosure. The optical system 100 may comprise an input light 104 that is provided as an input to a first optical element or set of optical elements 108. The first optical element or set of optical elements 108 conditions the input light 104 and generates a first output light 116. The first output light 116 is then provided to a second optical element or set of optical elements 120, which focus the first output light at a specific focal point, which may be located on a sample 124.

In some embodiments, the first optical element or set of optical elements 108 comprise a single-pass, double grating configuration to spatially chirp the input light 104 (e.g., remove the temporal chirp). The input light 104 may comprise one or a plurality of positively chirped femtosecond pulses generated by, for example, a 1 kHz Ti:Al2O3 chirped pulse amplification system. The pulses may be slightly positively chirped to avoid pulse front tilt at the second optical element or set of optical elements 120, given the single-pass, double grating configuration used to spatially chirp the beam.

The first optical element or set of optical elements 108 may be configured to remove the temporal chirp from the input light 104. Where the first optical element or set of optical elements 108 comprises a set of optical elements, a plurality of individual optical elements 112a-d may be included in the first optical element or set of optical elements 108. As one example, a first individual optical element 112a may correspond to a mirror, a second individual optical element 112b may correspond to a diffraction grating (or prism), a third individual optical element 112c may correspond to another diffraction grating (or prism), and a fourth individual optical element 112 may correspond to another mirror. As a more specific non-limiting example, the first optical element or set of optical elements 108 may comprise a grating system which includes two 600 l/mm gratings 112b, 112c used at an angle of incidence of 36 degrees and a separation of 630 mm, as measured along the perpendicular between the gratings. A suitable type of grating 112b, 112c that may be used is manufactured by Thorlabs under part number GR25-0608.

The grating separation and angle can be selected to minimize second and third order dispersion of the light as it travels through the first optical element or set of optical elements 108. Pulse compression can be third-order limited as a result of the mismatch between the 1200 l/mm gratings in the laser compressor which generates the input light 104 and the 600 l/mm gratings used to spatially chirp the beam. In some embodiments, the net efficiency of the two 600 l/mm gratings is 50%.

The first optical element or set of optical elements 108 conditions the input light 104 to generate the first output light 116. In some embodiments, the radius of the first output beam of light 116 incident on the second optical element or set of optical elements 120 (e.g., a focusing optic) is approximately 7.4 mm in the chirped dimension, as measured to the 1/e2 radius of the central intensity. In the unchirped dimension, the beam 116 width is approximately 0.69 mm at the 1/e2 radius.

In some embodiments, the beam 116 is focused into the sample 124 using a 25 mm focal length, 90-degree off-axis parabola, such as those produced by Janos Technology under part number A8037-175. At focus, the beam can be approximately 33 μm at the 1/e2 radius in the direction of spatial chirp. The pulse width at focus can be approximately 74 fs full-width at half maximum (FWHM) amplitude with the assumption of a hyperbolic secant pulse shape.

In some embodiments, the temporally chirped pulses of the input light 104 can be spatially chirped then collimated by the gratings of the first optical element or set of optical elements 108. After the second grating, the intensities, I, of all frequencies of the first output light 116 overlap in time, t, but the frequencies do not overlap spatially except at the focal plane of the sample 124.

Figure 2:
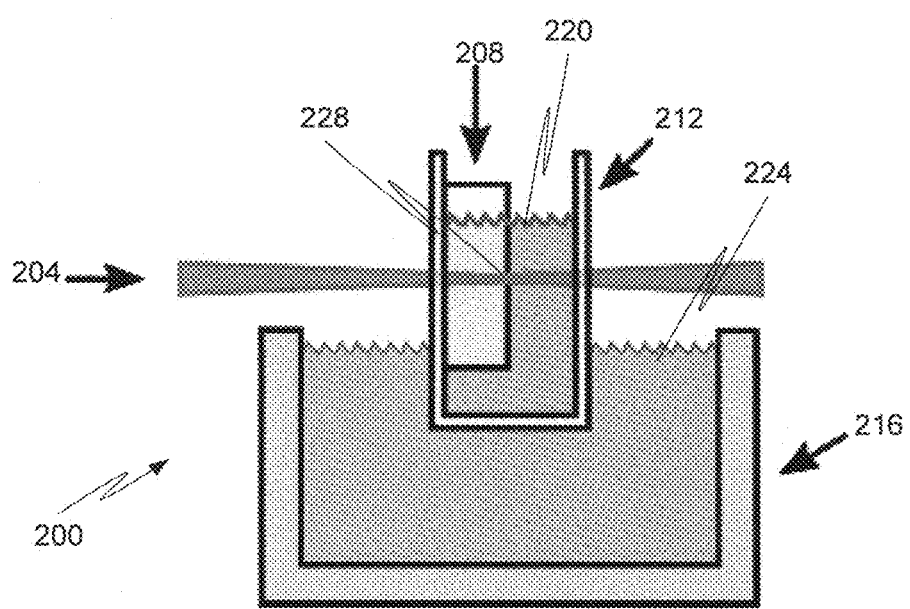
FIG. 2 is a schematic diagram of a sample mounted in a chamber in accordance with embodiments of the present disclosure.

With reference now to FIG. 2, a non-limiting example application of the system 100 will be described in accordance with embodiments of the present disclosure. Specifically, a sample system 200 can be set up which includes a cutting light input 204 which is focused at a focal point 228 on the back plane of a sample 208. The cutting light input 204 may correspond to an output of light from the second optical element or set of optical elements 120. In other words, the cutting light input 204 may correspond to spatially chirped pulses of light that are temporally and spatially focusing at the back plane of the sample 208.

The sample 208 may be immersed in a first fluid 220 contained in a first chamber 212. In some embodiments, the first chamber 212 corresponds to glass or any other type of optically transparent material. The first chamber 212 may be partially immersed in a second fluid 224 contained in an ultrasonic bath 216.

Experiments have been performed with the system 200 where channels and/or holes were ablated on the back surface of a 6 mm thick fused silica window. Debris removal was aided by ultrasonic waves generated in the second fluid 224 by the ultrasonic bath 216. The sample 208 was mounted in a partially immersed glass chamber 212 with 1 mm thick walls. Microfluidic channels were lengthened at a scan rate of 15 μm/s and deepened by 10 μm steps in the axial direction between scans. To determine the maximum aspect ratio of features, holes were machined in the back surface of the sample 208 by scanning the sample 208 axially at 10 μm/s.

An important quality of temporally focused pulses is a symmetric laser spot at the focus of the off-axis parabola. FIG. 3A depicts one example of a ray-tracing model where light 304 is focused by a parabolic mirror (or lens) 308 at a focal point 312. The light 304 may correspond to the first output light 116. The ray-tracing depicted in FIG. 3A can yield a diffraction-limited, round spot in focus, which indicates that both the spatially chirped and non-spatially chirped dimensions of the beam focus to the same size, as can be seen in FIG. 3B. The symmetry of the focal spot 312 was experimentally verified and is shown in FIG. 3C. Ray-tracing can be performed with 6 mm of fused silica placed before the focal plane as a means to simulate backside machining. The focal spot is no longer symmetric. Dispersion from the fused silica stretched the focal spot along the spatially chirped dimension as different colors focused to slightly different lateral positions FIG. 3D. The asymmetry was directly dependent on the thickness of the glass. With the experimental beam parameters described above, a symmetric, diffraction-limited focal spot can be obtained for fused silica samples less than approximately 2 mm thick.

While ray-tracing provides details on the geometrical aspects of beam propagation that result from temporal focusing, additional insight into the behavior of the laser pulses can be gained by calculating the spatio-temporal pattern of a pulse as it propagates through free space. These aspects are depicted in more detail in FIGS. 4A-E and 5. In particular, as can be seen in FIG. 4E, the pulse appears as a traveling wave that is transform-limited in time as well as diffraction-limited in space.

In accordance with at least some embodiments of the present disclosure, the success of temporal focusing for backside micromachining (and other similar applications) lies with the improvement in the axial confinement of the intensity of light and the reduction in the out-of-focus nonlinear interaction with the substrate.

Figure 5:
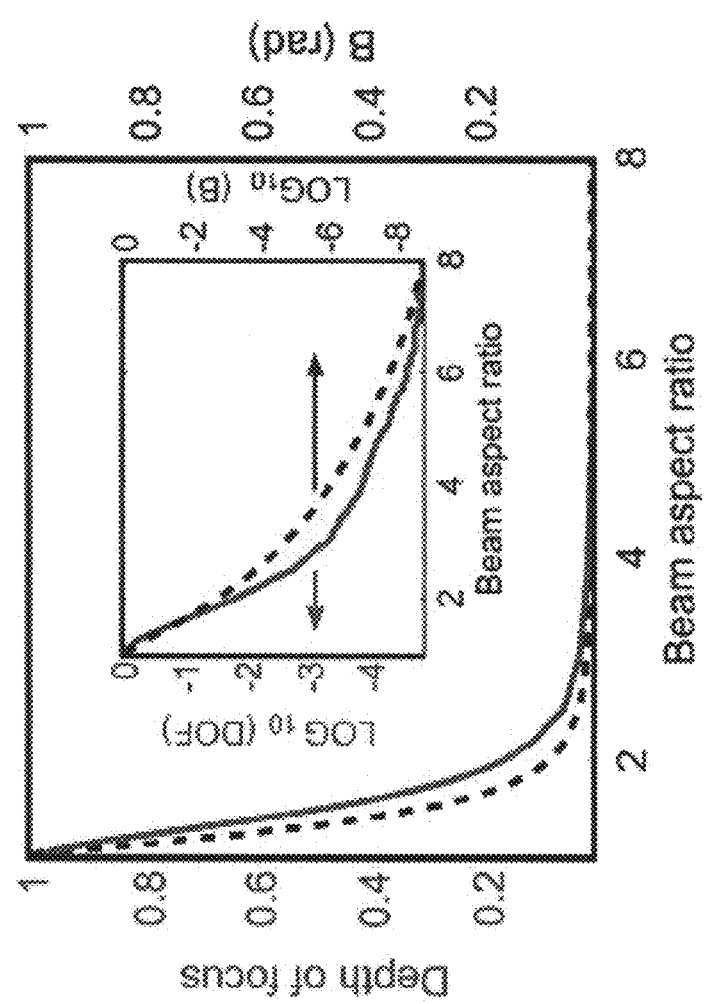
FIG. 5 is a chart depicting the depth of focus and the B-integral as a function of beam aspect ratio in accordance with embodiments of the present disclosure.

As can be seen in FIG. 5, the depth of focus and the nonlinear phase accumulation, referred to as the B-integral, are plotted as a function of the spatial chirp. The degree of spatial chirp is given by the beam aspect ratio (BAR): the ratio of the spatially chirped beam diameter to the non-spatially chirped beam diameter. The depth of focus is measured as the half width at half maximum (HWHM) amplitude of the axially dependent intensity profile. The peak value of the intensity has been recorded for each axial position in the simulation depicted by FIGS. 4A-E. The HWHM can then be calculated for the full peak-intensity profile, and this process was repeated for each value of the BAR. It has been observed that the B-integral decreases as the BAR increases (inset to FIG. 5). For example, increasing the BAR from 4 to 8 results in more than a factor of 10 improvement in the B-integral. Embodiments of the present disclosure can produce a BAR of approximately 11.

Figure 6:
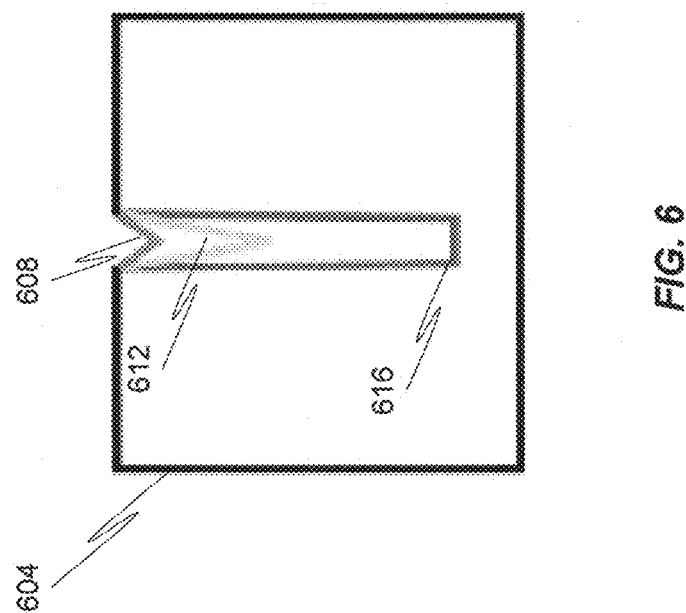
FIG. 6 is a cross-sectional view of a sample that compares the shapes of channels fabricated by chemical etching, front surface laser ablation, and back surface laser ablation.

FIG. 6 shows a comparison of channel or hole profiles created in a sample 604 using a number of different ablation processes. A first channel profile 608 created by chemical etching is relatively shallow as compared to a second channel profile 612 created with front surface laser ablation (e.g., laser ablation where the laser beam is focused on the front surface of the sample 604) and a third channel profile 616 created using back surface laser ablation concepts of the present disclosure.

There are also significant differences between the second channel profile 612 and third channel profile 616. Specifically, the second channel profile 612 is not as deep as the third channel profile 616. One reason for this is because the laser beam must pass through the debris that is created during the early stages of ablation. Another reason for this is due to the shape of the beam and the refraction of the light on the walls of the channel.

On the other hand, back surface laser ablation as proposed herein is capable of focusing on the sample 604 without having to travel through the debris created during ablation or travel through the channel. Not only does this enable a deeper channel depth, but the third channel profile 616 can create a more rectangular profile as compared to the "v-type" profile created by front surface laser ablation.

The ability to machine channels in glass, plastic, and other similar optically transparent materials with a high aspect ratio (the depth to width ratio of the channel cross section) may benefit several types of microfluidic applications. For instance, embodiments of the present disclosure may be employed to create channels with an aspect ratio of 2 sufficient to focus particles into one plane along the depth dimension (approximately 2).

It may also be possible to employ aspects discussed herein to design a rapid microfluidic mixer for reaction dynamics studies where rapid mixing is achieved by squeezing reagents through a nozzle with a large aspect ratio (approximately 10). The dynamics of such a system can be measured with confocal microscopy. Even higher aspect ratio channels would be necessary for optical measurements that have a larger Rayleigh range, as is common for absorption measurements, to achieve mixing uniformity in the axial dimension.

Many types of experiments in microfluidic devices may benefit from the properties of glass. In other words, it may be beneficial to employ principles of the present dislcosure to create microfluidic devices from glass and other silica-based materials rather than creating such devices from the traditional PDMS. The mechanical strength of glass withstands pressure from the high flow rates used in inertial focusing and in rapid mixing. The chemical stability of glass is an advantage for chemical reaction studies, and the optical transparency of glass benefits white light imaging and absorption and fluorescence measurements.

The common fabrication approach for glass microfluidic devices, i.e., chemical etching, cannot yield the high aspect ratio channels required in these studies. Microfluidic channels fabricated by chemical etching have aspect ratios of less than one.

Figure 7:
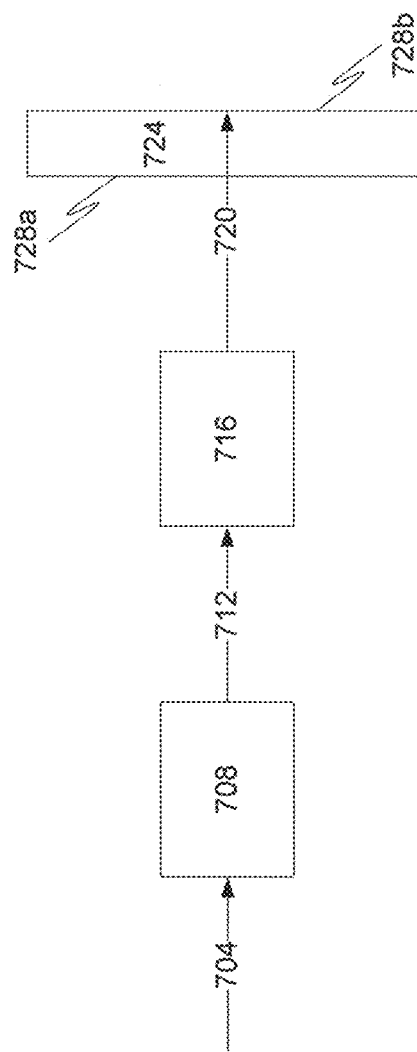
FIG. 7 is a block diagram depicting a first optical system in accordance with embodiments of the present disclosure.

With reference now to FIG. 7, a simplified block diagram depicting an optical system capable of manipulating light (e.g., laser light or a laser beam) will be described in accordance with embodiments of the present disclosure. The system depicted in FIG. 7 may represent a simplified version of the system 100 depicted in FIG. 1. The optical system of FIG. 7 comprises a first light input 704, a first optical element 708, a first light output 712, a second optical element 716, a second light output 720, and an object 724. The first light input 704 may be similar or identical to the input light 104. Specifically, the first light input 704 may correspond to a pulsing laser output. In some embodiments, the first light input 704 may be pulses of a duration on the order of femtoseconds. The first optical element (or elements) 708 may be configured to receive the temporally chirped pulses of the first light input 704, spatially chirp and then collimate the frequencies. The resultant output of the first optical element (or elements) 708 is the first light output 712. In some embodiments, a plurality of mirrors and/or lenses may be provided as the first optical element (or elements) 708.

In accordance with embodiments of the present disclosure, the first light output 712 may comprise a plurality of spatially separated wavelengths (or frequencies) of light, but the intensities of each spatially separated wavelength (or frequencies) may still overlap in time. In other words, the first light output 712 comprises spatially chirped pulses of light that are collimated and the temporal chirp is removed. However, the spatially separated wavelengths (or frequencies) do not overlap spatially. Rather they are conditioned to travel parallel to one another until they reach the second optical element 716.

The second optical element 716 may correspond to a focusing element. In some embodiments, the second optical element 716 comprises a parabolic mirror and/or shaped lens (either concave or convex). In some embodiments, a plurality of mirrors and/or lenses may be provided to spatially focus the first light output 712. Accordingly, the output of the second optical element 716 may be considered a focused output.

In accordance with at least some embodiments of the present disclosure, the second optical element 716 spatially focuses the first light output 712 to create the second light output 720. The second light output 720 may be focused on the object 724 to alter one or more properties of the object 724. In some embodiments, the second light output 720 may be focused on the back surface of the object 724 to perform back surface laser ablation. A more specific application for the second light output 720 would be to ablate biological materials. Ablation of biological materials does not necessarily require back surface ablation, especially where the biological material is not optically transparent. Accordingly, the spatially chirped pulses described herein may also be used in front surface ablation without departing from the scope of the present disclosure.

Ablation with temporal focusing can potentially enable a variety of femtosecond laser surgeries, which have been previously demonstrated with standard beams and under non-physiological, dry conditions. Studies of neuronal activity typically require thinning or removal of a portion of the skull to provide optical access to the brain. During this process, continual flushing with physiological saline is necessary to maintain tissue viability and to rinse away debris. Nonlinear interaction with the saline prohibits the use of low NA beams.

However, with spatially chirped pulses and temporal focusing, rapid material removal under aqueous immersion is possible at low NA.

Ablation on the backside or in the interior of a transparent biological tissue (e.g., biological materials found in the human eye) should also be possible with consideration of the optical properties of the tissue, such as the shape and homogeneity, that may be expected to directly affect the quality of the focus.

Figure 8:
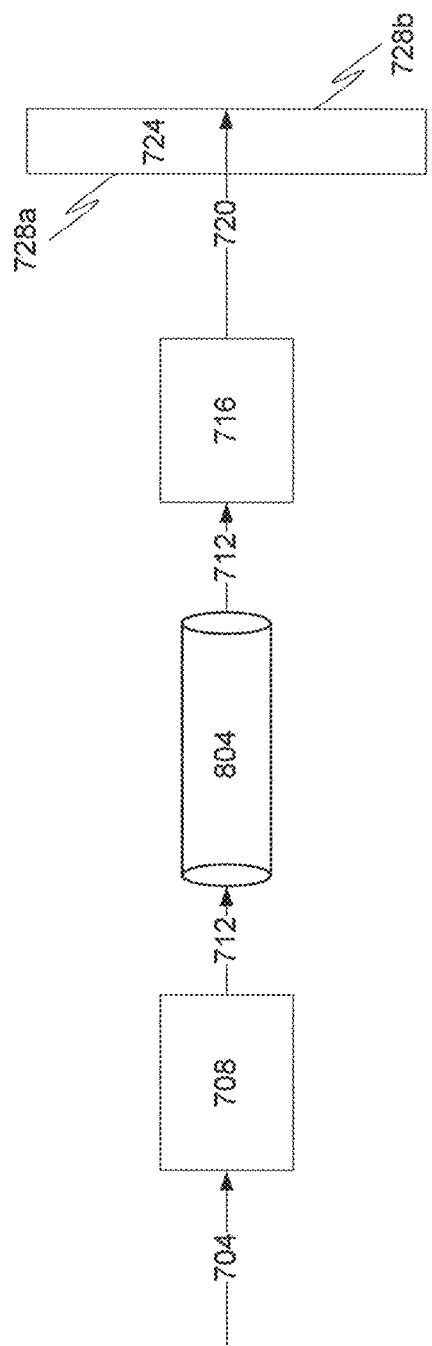
FIG. 8 is a block diagram depicting a second optical system in accordance with embodiments of the present disclosure.

FIG. 8 depicts a possible modification to the system of FIG. 7. The optical system depicted in FIG. 8 includes an optical conduit 804 that is capable carrying the various wavelengths (or frequencies) of the spatially chirped and collimated laser pulses (e.g., the first light output 712) across a distance. It may also be possible to configure the optical conduit 804 to cause the first light output 712 to travel a non-linear path from the first optical element 708 to the second optical element 716. This may be particularly useful to faciliate minimally-invasive surgeries (e.g., arthroscopic surgeries) or non-invasive procedures.

Figure 9:
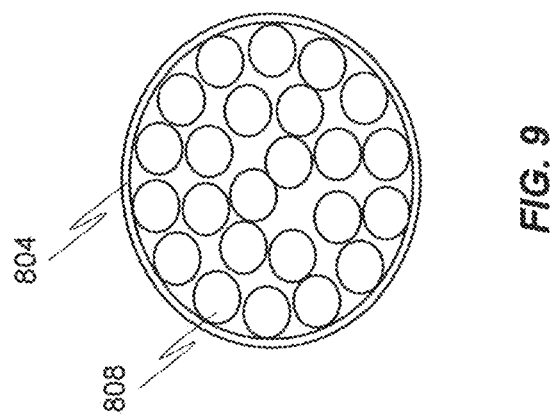
FIG. 9 is a cross-sectional view of a bundle of fiber optic elements used to carry different wavelengths of a spatially-chirped beam of light in accordance with embodiments of the present disclosure.

More specifically, and as can be seen in FIG. 9, the optical conduit 804 may comprise a bundle of optical fibers 808, each of which are responsible for carrying different wavelengths (or frequencies) of the spatially chirped and collimated light (e.g., the first light output 712). The optical conduit 804 and the optical fibers 808 may be contained within an endoscopic device. The optical conduit 804 may be responsible for carrying the first light output 712 into a human body. The second optical element 716 may be positioned at the end of the endoscopic device, thereby allowing the first light output 712 to be focused into the second light output 720. Focusing of the second light output 720 may facilitate the cutting, fusing, etc. of biological material within a patient.

Compensation mechanisms may also be included in the optical conduit 804 or in the second optical element to account for the different wavelengths traveling different distances within the optical conduit 804. More specifically, a compensation mechanism can be envisioned which dynamically measures the length (or amount of bend) of each optical fiber 808 in the optical conduit 804 and delays one or more wavelengths (or frequencies) of light in certain optical fibers 808 to ensure that all wavelengths (or frequencies) of a spatial chirp are temporally overlapped when they reach the second optical element 716. The delaying mechanisms may correspond to any type of known mechanisms for delaying light propagation, but, if possible, should not introduce substantial losses.

It should be noted that the cross-sectional shape of the optical conduit 804 and/or optical fibers 808 do not necessarily need to be circular. Rather, any arrangement of optical fibers 808 in the optical conduit 804 may be accommodated. For instance, the optical fibers 808 may be arranged in a linear array and the optical conduit 804 may have a square or rectangular cross-sectional profile. As another example, the optical conduit 804 may comprise an elliptical cross-sectional profile. Other profile shapes are also possible.

It has been demonstrated above that the use of temporal focusing with low numerical aperture beams for femtosecond micromachining can be achieved. This geometry mitigates nonlinear interactions such that material can be ablated through large path lengths of optically transparent material. It has also been shown that features with much higher aspect ratios can be produced using this technique as compared with features which are produced using chemical etching. Although backside laser ablation is not the only technique for producing high aspect ratio channels in glass, it does add to the already extensive list of machining capabilities for femtosecond lasers in transparent materials and it is the only single-step fabrication method for producing high aspect ratio channels in glass, which is especially useful for rapid prototyping.

High aspect ratio channels are extremely useful for some types of microfluidic experiments that implement inertial focusing or rapid mixing, for example. With temporal focusing, aspect ratios up to about 26 can be achieved. The aspect ratio is not necessarily the same in the spatially chirped and unchirped beam dimensions. This effect is consistent with simulations that predicted an elongated focal spot in the chirped dimension as a result of dispersion from a 6 mm thick fused silica substrate. This asymmetry is expected to increase for thicker samples, an important consideration for attaining high aspect ratio features in thick substrates. In principle, it is possible to precompensate for this chromatic aberration.

Machining at low NA results in a large volume of material removed per pulse. Microfluidic channel machining rates of about 25 µm3 per 80 µJ pulse have been disclosed herein. However, the low repetition rate of some lasers discussed herein is prohibitive for fabricating complete microfluidic devices that typically consist of centimeters of channels. For example, at the demonstrated machining rate, 100 µm square microfluidic channels could be machined at a rate of one linear cm per hr. Clearly, higher repetition rate lasers would be more useful for full-scale microfluidic device fabrication, and such lasers are commercially available. For instance, a 100 kHz laser could machine the channel at a rate of 1.5 linear cm per min at the same pulse energy. This is an attractive machining rate for centimeter-scale microfluidic devices. In fact, this machining rate would surpass other methods such as fabrication by etching and/or lithography for many microfluidic channel geometries.

Machining at low NA can also improve the ablation rate of bone under aqueous immersion, and the same laser system should allow ablation of a cubic millimeter of bone in under one minute. In general, it is anticipated that femtosecond laser micromachining with temporal focusing may benefit other biomedical applications such as all optical histology and deep tissue ablation in laser surgery.

Specific details were given in the description to provide a thorough understanding of the embodiments. However, it will be understood by one of ordinary skill in the art that the embodiments may be practiced without these specific details.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. An optical system, comprising:
a first optical element or set of optical elements that receives temporally chirped pulses of light and then spatially chirp the received pulses of light; and
a second optical element or set of optical elements that focuses the spatially chirped light that is output by the first optical element or set of optical elements.

2. The optical system of claim 1, wherein the spatially chirped pulses of light are also collimated to overlap in time but not overlap spatially and wherein the second optical element or set of optical elements focuses the collimated and spatially chirped light through an object onto a back surface of the object.

3. The optical system of claim 2, wherein the focused light ablates the back surface of the object.

4. The optical system of claim 3, wherein the object comprises an optically transparent material.

5. The optical system of claim 4, wherein the object comprises glass.

6. The optical system of claim 4, wherein the object comprises a biological material.

7. The optical system of claim 4, wherein the object is less than 2 mm thick and wherein the focused light creates a substantially uniform focal spot.

8. The optical system of claim 1, wherein the first optical element or set of optical elements comprises a grating system.

9. The optical system of claim 8, wherein the grating system includes two diffraction gratings that are configured to minimize second and third order dispersion of light as it travels through the first optical element or set of optical elements.

10. The optical system of claim 8, wherein the grating system includes at least one of a grating and prism configured to diffract light.

11. The optical system of claim 1, wherein the temporally chirped pulses of light comprise femtosecond laser pulses.

12. The optical system of claim 11, wherein the femtosecond laser pulses are positively chirped to avoid pulse front tilt prior to reaching the second optical element or set of optical elements.

13. The optical system of claim 1, wherein the second optical element or set of optical elements comprises at least one of a lens and parabolic mirror.

14. The optical system of claim 1, further comprising an optical conduit which includes a plurality of optical fibers, wherein each of the optical fibers carry different wavelengths of the spatially chirped and collimated light from the first optical element or set of optical elements to the second optical element or set of optical elements.

15. A method, comprising:
receiving temporally chirped pulses of a light beam;
spatially chirping and collimating the temporally chirped pulses of the light beam such that different frequencies of the spatially chirped and collimated light overlap in time; and
focusing the different frequencies of the spatially chirped and collimated light at a focal plane, wherein the different frequencies of the spatially chirped and collimated light only spatially overlap at the focal plane.

16. The method of claim 15, wherein the focal plane coincides with the back plane of an object.

17. The method of claim 16, wherein the back plane of the object is ablated with the focused light.

18. The method of claim 15, wherein the temporally chirped pulses of light comprise stretched laser pulses and wherein focusing the different frequencies of the spatially chirped and collimated light at the focal plane create a focused light beam with an axial intensity profile that breaks a confocal limit of the light beam.

19. The method of claim 15, wherein the temporally chirped pulses of light are focused at a low numerical aperture.

20. An optical system for modifying properties of an object, the system comprising:
a first set of optical elements configured to receive a first light input and produce a first light output, the first light input comprising temporally chirped pulses of light and the first light output comprising spatially chirped and collimated light with different frequencies overlapping in time, wherein the first set of optical elements comprises a single-pass, double grating configuration of optical elements which are used to spatially chirp and collimate the first light input; and
a second optical element configured to receive the spatially chirped and collimated first light output and produce a second light output which focuses the different frequencies of the spatially chirped and collimated first light output at a focal plane for ablating at least one of glass and biological materials.

21. The optical system of claim 20, wherein the second optical element localizes an axial intensity of the spatially chirped and collimated first light output.

22. The optical system of claim 1, wherein the focused light ablates the front surface of the object.

* * * * *